Patented July 18, 1933

1,919,141

UNITED STATES PATENT OFFICE

CLARENCE L. WEIRICH, OF WESTPORT, CONNECTICUT

PROCESS OF CARROTING FUR AND COMPOSITIONS FOR CARROTING

No Drawing.     Application filed May 21, 1931. Serial No. 539,151.

This invention relates to processes of carroting fur and compositions for carroting, and it comprises a process wherein animal fur, for example, rabbit fur is treated with a solution containing mercuric nitrate, nitric acid, and hydrogen peroxide, it further comprises processes wherein fur is treated with a carroting solution of the character just described to which a small amount of a soluble fluoride has been added, and it further comprises a carroting solution containing mercuric nitrate, nitric acid, and hydrogen peroxide, to which a soluble fluoride is advantageously added.

Animal fur, such as that which goes to make up an ordinary felt hat, must be processed to free it of dirt, coarse hairs, and waxy, perhaps silicious, compounds which form a sort of coating about the hair fiber. Dirt and coarse hairs can be easily removed from the fur by mechanical methods but the removal of the waxy coating requires chemical treatment. This coating obscures microscopic barb-like portions of the fiber and, before the fiber can be felted, it is necessary that the fiber be freed of the coating. A fiber which has been purified, and which is suitable for felting, is one in which the coating has been removed so that the "barbs" are exposed. These barbs play a prominent part in the felting operation.

The operation of treating the fur chemically to remove the outer coating of waxy material is commonly referred to in the art as carroting. A number of different carroting solutions have been suggested. For a great many years, a solution of mercuric nitrate has been commonly employed and for some little understood reason, this substance is an effective carroting agent. Mercuric nitrate, however, possesses certain disadvantages. Chief among them, as regards the character of the treated fur, is the fact that mercuric nitrate tends to give the fur a yellowish color. Of late, it has been proposed to use an alkaline solution of hydrogen peroxide although hydrogen peroxide alone was suggested a number of years ago. In spite of the claims made for substitutes for mercuric nitrate, this substance still remains the best carroting compound at present known. One of the difficulties with using alkaline solutions of hydrogen peroxide resides in the fact that such solutions tend to decompose and it is desirable that a carroting solution be of such nature chemically that quantities of it can be kept on hand over moderately long periods of time.

I have now discovered that most of the disadvantages inherent in the use of mercuric nitrate solutions can be overcome provided hydrogen peroxide is added to the mercuric nitrate solution. Moreover, I have discovered that the addition of a soluble fluoride enhances the carroting action of a mercuric nitrate solution containing hydrogen peroxide. My carroting solution accordingly comprises an aqueous solution of mercuric nitrate, free nitric acid and hydrogen peroxide to which is added a small amount of a soluble fluoride.

My solution is advantageously prepared in the following manner. I first make up a mercuric nitrate solution by mixing 80 parts of a 40% nitric acid solution with 20 parts of metallic mercury. This gives me a solution containing about 32% of mercuric nitrate, 20% of free nitric acid and 48% of water. This solution is about the same as the mercuric nitrate carroting solution ordinarily used.

I then take one half gallon of the above solution, dilute it with three gallons of water and add thereto about one and one half gallons of water containing about one half ounce of ammonium fluoride. To the resulting solution I then add two and one half gallons of a commercial peroxide solution (usually about 3% strength) and finally two and one half gallons of water.

The above proportions are merely illustrative of my invention. The quantity of hydrogen peroxide can be varied within rather wide limits, say from one half gallon to four or five gallons and the amount of ammonium fluoride can be increased up to seven or eight ounces if desired. The quantity of fluoride depends largely upon the amount of siliceous material which must be removed from the fur fiber as more fully explained hereinafter.

The fur to be carroted is then treated with the thus prepared solution until the carroting action has proceeded to the desired extent.

I find that fur carroted with my solution does not develop the yellow color ordinarily observed when mercuric nitrate is used alone. I attribute this to the presence of the hydrogen peroxide in the carroting solution. Probably the peroxide acts as a bleaching agent to destroy any color which might otherwise result. Moreover, I find that the fur is carroted to a higher degree and that the carroted fur has better felting qualities. Although I am unable to explain the action which takes place, nevertheless I believe that the hydrogen peroxide in the presence of the nitric acid in the solution, plays a substantial part in the carroting action itself and undoubtedly acts as a carroting agent as well as a bleach. Furthermore, the nitric acid in the solution tends to stabilize the hydrogen peroxide and prevent its decomposition and by the co-joint action of the mercuric nitrate, the nitric acid and the hydrogen peroxide, I am able to obtain a carroted fur which is remarkably free from the yellow color customarily resulting when mercuric nitrate is used alone. It may be that the hydrogen peroxide in addition to its carroting and bleaching action, restrains the normal action of the free nitric acid on the protein constituents of the fur fiber since it is an observed fact that nitric acid will discolor protein material.

Instead of ammonium fluoride, I can use other soluble fluorides such as hydrofluoric acid and alkali metal fluorides. In my composition, the fluoride, in addition to acting as a "cleanser" to remove what is commonly termed "rust", doubtless dissolves any siliceous material which may form a part of the coating about the fur fiber. Ammonium fluoride or other soluble fluoride, in the presence of the free nitric acid probably reacts to liberate free hydrofluoric acid and this in turn attacks the siliceous material in much the same way that glass is etched by a hydrofluoric acid solution. It is unlikely that the acid attacks the waxy coating which is associated with the fibers since ordinary wax is not dissolved by such an acid. More probably the fluoride dissolves a superficial coating of siliceous material overlying the waxy coating itself and thus permits the actual carroting compounds to attack the waxy underlying coating.

Although I have stated what I believe to be the action of the various substances in my solution, I nevertheless do not wish to be bound by the theory proposed. The above explanation is, however, a reasonable one and I believe it approximates the true state of affairs. It will thus be apparent that, as stated, other fluorides which liberate free hydrofluoric acid are equivalents of the ammonium fluoride which I specifically use.

Having thus described my invention, what I claim is:

1. A carroting solution comprising an aqueous solution of mercuric nitrate, hydrogen peroxide, nitric acid and a soluble fluoride reactive with the nitric acid to form hydrofluoric acid.

2. A carroting solution comprising an aqueous solution of mercuric nitrate, hydrogen peroxide, and nitric acid to which has been added a small amount of a soluble fluoride.

3. A carroting solution comprising an aqueous solution of mercuric nitrate, hydrogen peroxide and nitric acid to which has been added a small quantity of ammonium fluoride.

4. A carroting solution comprising an aqueous solution of about one half gallon of mercuric nitrate solution containing about thirty two percent of mercuric nitrate, and twenty percent of nitric acid, one and one half gallons of water containing about one half ounce of ammonium fluoride, and two and one half gallons of hydrogen peroxide solution, the whole being diluted with about two and one half gallons of water.

5. The process of carroting fur which comprises subjecting the fur to the action of an aqueous carroting solution containing mercuric nitrate, hydrogen peroxide and nitric acid to which has been added a small amount of a soluble fluoride.

6. The process of carroting fur which comprises subjecting the fur to the action of an aqueous carroting solution containing mercuric nitrate, hydrogen peroxide, and nitric acid, to which has been added a small quantity of ammonium fluoride.

CLARENCE L. WEIRICH.